United States Patent
Le Clerc et al.

(10) Patent No.: US 8,088,845 B2
(45) Date of Patent: Jan. 3, 2012

(54) PARAFFIN WAX COMPOSITION

(75) Inventors: Stephane Le Clerc, Petir Couronne (FR); Mohd Yazid Bin Jaafar, Kuala Lumpur (MY); Antonius Adrianus Maria Roovers, Amsterdam (NL); Jason Boon Eong Teh, Kuala Lumpur (MY)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 12/599,352

(22) PCT Filed: May 8, 2008

(86) PCT No.: PCT/EP2008/055696
§ 371 (c)(1),
(2), (4) Date: Aug. 24, 2010

(87) PCT Pub. No.: WO2008/138859
PCT Pub. Date: Nov. 20, 2008

(65) Prior Publication Data
US 2010/0311875 A1    Dec. 9, 2010

(30) Foreign Application Priority Data
May 10, 2007 (MY) .................. PI20070727

(51) Int. Cl.
*C08L 95/00* (2006.01)
(52) U.S. Cl. ............. 524/68; 524/69; 524/70; 524/71
(58) Field of Classification Search ............ 206/524.1; 524/68–71
See application file for complete search history.

(56) References Cited

U.S. PATENT DOCUMENTS

| | | | | |
|---|---|---|---|---|
| 2,777,480 A * | 1/1957 | Linda | | 141/11 |
| 3,469,363 A * | 9/1969 | Berckmoes | | 53/440 |
| 4,039,485 A | 8/1977 | Argabright et al. | | 260/2.2 R |
| 5,373,682 A | 12/1994 | Hatfield et al. | | 53/440 |
| 5,401,455 A | 3/1995 | Hatfield et al. | | 264/255 |
| 5,452,800 A | 9/1995 | Muir | | 206/447 |
| 5,527,491 A | 6/1996 | Riga et al. | | 252/356 |
| 5,669,207 A | 9/1997 | Hull | | 53/440 |
| 5,715,654 A | 2/1998 | Taylor et al. | | 53/440 |
| 5,806,285 A | 9/1998 | Rizzieri | | 53/453 |
| 5,942,082 A | 8/1999 | Winter et al. | | 156/498 |
| 6,138,441 A | 10/2000 | Kik et al. | | 53/440 |
| 6,155,029 A | 12/2000 | Jain | | 53/440 |
| 6,230,890 B1 | 5/2001 | Waver et al. | | 206/447 |
| 6,430,898 B1 | 8/2002 | Remmers et al. | | 53/440 |
| 6,588,974 B2 | 7/2003 | Hildebrand et al. | | 404/31 |
| 7,300,565 B2 | 11/2007 | Hoek | | 208/89 |
| 2007/0199476 A1 | 8/2007 | Bobee et al. | | 106/275 |

FOREIGN PATENT DOCUMENTS

| | | |
|---|---|---|
| AU | 778079 | 7/2001 |
| EP | 1268712 | 1/2003 |
| EP | 1498469 | 1/2005 |
| EP | 1534802 | 6/2005 |
| WO | WO9934917 | 7/1999 |
| WO | WO0068106 | 11/2000 |
| WO | WO0216499 | 2/2002 |
| WO | WO02061009 | 8/2002 |
| WO | WO02102941 | 12/2002 |
| WO | WO2004009739 | 1/2004 |
| WO | WO2004037671 | 5/2004 |
| WO | WO2006050108 | 5/2006 |

* cited by examiner

*Primary Examiner* — Peter Szekely

(57) ABSTRACT

The invention is directed to a paraffin wax contained in a thermoplastic polymer packaging material which is meltable along with the paraffin wax.

5 Claims, No Drawings

PARAFFIN WAX COMPOSITION

PRIORITY CLAIM

The present application claims priority to Malaysian Patent Application P120070727.9 filed 10 May 2007.

FIELD OF THE INVENTION

The present invention is directed to a process for the preparation of a paraffin wax composition in a polymer packaging film. The present invention further relates to a method for packaging wax material having a finite size and shape using a film to surround the material, the resulting package formed thereby, and the use of the package in a process to prepare a blend of bitumen and wax. It is further directed at the paraffin wax composition in the packaging film, and at a process to incorporate it into a bitumen composition.

BACKGROUND OF THE INVENTION

A common characteristic of most paraffin waxes is that they are solid or semi-solid at ambient temperature and liquid at elevated temperatures. For transportation from source to end-use location, high melting paraffin waxes that are solid at ambient temperature are usually solidified and handled as solid shaped articles, e.g. pellets, blocks or plates, often in combination with fibres.

The solidification usually requires a solidification apparatus such as cooling belt or prill towers and an energy intensive process. Furthermore the obtained products often cause blocking problems during transport, e.g. under gravity pressure. Alternatively, a wax has to be distilled and treated such that only a very high boiling portion is employed which has a sufficiently high melting point or hardness. This is cumbersome and requires energy consuming processes.

Lower melting paraffin materials are usually transported in bulk or in containers. When transported in bulk, they have to be maintained at a temperature sufficiently high to maintain a viscosity low enough to allow for easy pumping and transfer. When transported in containers, e.g. metal drums or ibc's, the wax temperature usually drops to ambient and the product becomes solid or semi-solid. These containers are then generally transported and stored at ambient temperature.

Methods of shipping such wax compositions create problems related to the cost and disposal of the packaging materials. Before use, the containers and the material they contain have to be heated up to allow for the handling of the product. This requires specific heating apparatus, an excessive amount of heat, and may result in damage to the material and container due to hot spots. It further involves cumbersome handling at elevated temperatures.

Furthermore, the removal of residual wax from the containers is difficult, while equally reducing the amount that can actually be employed. The used containers further often have to be disposed of due to the residual wax inside. Further, the containers create other difficulties in that in absence of suitable heating equipment a great deal of physical force must be applied to the adhesive to extract it from these containers, making the wax difficult and inconvenient to handle.

The above described disadvantages are even further elevated when microcrystalline wax products having a congealing point of 95-120° C. are to be transported, such as the Fischer-Tropsch derived products as described for instance in EP-A-1534802. The softness of such wax products makes their handling as a solid material particularly difficult at higher ambient temperatures, while transport, as the molten product requires maintenance at a temperature above the congealing temperature, which is difficult and economically often not feasible.

Accordingly, there remains the need to devise a suitable means for cooling, storing and transporting such materials. Yet further, the above disclosed wax products are highly suitable as additives for bitumen for various uses. It would therefore be desirable to have packaged paraffin wax that can be transported and blended with bitumen in an efficient manner.

SUMMARY OF THE INVENTION

This has been achieved by the process and products according to the subject invention, by designing a package which encloses the wax composition and is which meltable along with the wax. Accordingly, the present invention relates to a paraffin wax composition comprising a paraffin wax contained in a thermoplastic polymer packaging material which is meltable along with the paraffin wax.

DETAILED DESCRIPTION OF THE INVENTION

Preferably, the thermoplastic polymer packaging material is a polymer film having a melting point in the range of from 65 to 240° C.

The melting and softening points may be determined by a skilled reader depending on the desired application. Usually, the material will have a softening point of not below 95° C., since this permits to pour in the molten wax, and a melting point that allows the thermoplastic material to melt into the liquid bitumen when it is being blended. Preferably the thermoplastic polymer material has a ring and ball softening point ("softening point") higher than 90° C., more preferably higher than about 100° C., and even more preferably higher than about 120° C. The thermoplastic polymer material should have a softening point high enough to tolerate the temperatures of the molten wax. The ring and ball softening point may be measured by ASTM D36.

Preferably, the thermoplastic polymer packaging material has a dart impact strength of at least 900 gm as measured by test method IS: 2508. This is a method for determining the Impact Resistance of Plastic Film by the Free-Falling Dart Method.

Exemplary thermoplastic polymer materials for use as packaging material according to the invention include, but are not limited to, ethylene, propylene, ethylene-propylene copolymers, and butylene copolymers. Alternatively, copolymers of acrylates and methacrylates, such as butyl, propyl, ethyl, or methyl acrylate or methacrylate copolymerized with ethylene, propylene, or butylene, may also be used. Epoxy-functionalized copolymers such as a terpolymer of ethylene, butyl acrylate and glycidyl methacrylate may also be used to improve the impact-resistance and flexibility of packaging materials made thereof. Natural or synthetic rubbers may also be used; non-limiting examples include styrene-butadiene-styrene (SBS), styrene-butadiene rubber (SBR), styrene-ethylene-butylene-styrene (SEBS), or terpolymer made from ethylene-propylene diene monomer (EPDM). Particularly preferred plastic or polymer materials for use in the invention are selected from polyethylene, polypropylene, polystyrene, styrene-butadiene-styrene, styrene-butadiene, styrene-indene-styrene, copolymers of acrylates and methacrylates, ethylene-vinyl-acetate, atactic polypropylene, mineral or natural or synthetic fibers, and mixtures thereof. The materials may be in form of woven or non-woven sheets or bags.

Similar to the wax composition according to the invention, packaged hot melt pressure sensitive adhesives have been disclosed in U.S. Pat. No. 5,373,682, U.S. Pat. No. 6,430,898, U.S. Pat. No. 5,527,491 and WO-A-2006/050108. The packaging films disclosed in these publications are all based on high molecular weight polymers, which in hot-melt adhesive applications, after melting may not blend in homogeneously with the melted adhesive due to the high viscosity of the polymeric materials, leading to gelling and formation of lumps, and generally to non-homogenised compositions.

Applicants have surprisingly found that when employing a paraffinic wax, in particular a high molecular weight Fischer-Tropsch wax, in a thermoplastic polymer packaging material which is meltable along with the paraffin wax, in bitumen applications, no gelling or lumps were observed.

Preferably, the thermoplastic polymer packaging material is selected from the group consisting of polypropylene, polyethylene and copolymers, terpolymers of ethylene and ethylene/vinyl acetate, ethylene acrylate, ethylene methacrylate, ethylene methyl acrylate, ethylene methyl methacrylate, copolymers of ethylene and 1,6-mono- or di-unsaturated monomers, polyamides, polybutadiene rubber, polyesters such as polyethylene terephthatate, polybutylene terephthalate, polycarbonates, atactic poly-alpha-olefins, including atactic polypropylene, thermoplastic polyacrylamides, polyacrylonitrile, copolymers of acrylonitrile and other monomers such as butadiene, styrene, polymethyl pentene, polyphenylene sulfide, aromatic polyurethanes; styreneacrylonitrile, acrylonitrile-butadiene-styrene, styrene-butadiene rubbers, acrylonitrile-butadiene-styrene elastomers, Also, A-B, A-B-A, A-(B-A)n-B. (A-B)n-Y block copolymers wherein the A block comprises a polyvinyl aromatic block, and the B block comprises a rubbery midblock which can be partly hydrogenated.

More preferably, the thermoplastic polymer packaging material is a polyolefin, more preferably polyethylene and/or polypropylene.

The thermoplastic polymer packaging material may form a continuous film, a woven, or non-woven material Preferably, it forms continuous film. The film may comprise a single layer or multiple layers. In order to improve blocking resistance and mechanical stability, the thermoplastic polymer packaging material is preferably forming a multilayered film. Alternatively, a single layer may suffice which reduces costs. The thickness of the film may be readily determined by a skilled person depending on the application to which the bags or films are to be used. Preferably, the overall film thickness is in the range of from 50 to 500 micrometer, more preferably in the range of from 65 to 95 micrometer, more preferably in the range of from 75 to 85 micrometer.

The thermoplastic polymer material may be formed into sealable bags or films like that described in U.S. Pat. No. 5,452,800 for use in packaging. A very suitable polymeric thermoplastic material is for instance the so-called polybags provided for bitumen by material. Such polybags usually comprise a polyethylene and polypropylene film of a thickness in the range of from 75 to 85 micrometers, and are available in various shapes. The bag material preferably has a melting point in the range of from 60° C. to 240° C., more preferably from 100° C. to 200° C., a resistance to heat before softening above 120° C., and will not have any negative effect on bitumen quality once the packaged paraffin wax material is added to the bitumen in the final application.

The paraffin wax preferably has a congealing point of between 85 and 150° C., more preferably between 90 and 135° C., more preferably between 95 and 125° C., yet more preferably between 100 and 120° C.

The paraffin wax preferably has a PEN at 43° C., expressed in 0.1 mm, as determined by IP 376 of more than 5. More preferably the paraffin wax has a PEN at 43° C. as determined by IP 376 of more than 7. Preferably, the paraffin wax has a PEN at 43° C. as determined by IP 376 of below 350. Yet more preferably, the paraffin wax preferably has a congealing point of between 85 and 120° C. and a PEN at 43° C., expressed in 0.1 mm, as determined by IP 376 of more than 5.

The paraffin wax is preferably obtained by hydroisomerisation of the substantially linear paraffin wax as obtained in a Fischer-Tropsch process. The wax having the required congealing point may be isolated by distillation from the hydroisomerised product or alternatively the feed to the hydroisomerisation is so chosen that the soft paraffin wax is directly obtained from the hydroisomerised product.

The properties of the paraffin wax as obtained in said hydroisomerisation can be suitably modified by blending the wax as obtained by said hydroisomerisation and FT paraffin comprising of more than 90% n-alkanes.

Examples of the latter are for instance the commercially available products SASOBIT, Paraflint H1 and Sarawax SX100 and Sarawax SX105. Paraflint H1 is obtainable from Sasol-Moore and Munger. The Sarawax products are obtainable from Shell MDS Malaysia Sdn Bhd.

Examples of the Fischer-Tropsch synthesis and routes to this soft wax (bitumen) additive are described in WO-A-02102941, EP-A-1498469, WO-A-2004009739 and EP-A-1268712.

Applicants found that a very suitable paraffin wax can be obtained as a by-product of the following process wherein middle distillates are prepared from a Fischer-Tropsch wax. This process comprises the steps of (a) hydrocracking/hydroisomerisating a Fischer-Tropsch product, (b) performing one or more distillate separations on the effluent of step (a) to obtain a middle distillate fuel fraction and a soft paraffin wax additive having an initial boiling point of between 500 and 600° C. The additive is preferably obtained as a residual fraction in a vacuum distillation step. The PEN value at 43° C. of the wax as obtained by said process may be reduced if required by blending this wax with a wax fraction isolated by distillation from the starting Fischer-Tropsch product. This fraction, preferably hydrogenated in order to remove oxygenates and olefins and having a congealing point of between 90 and 120° C., is a substantially normal paraffin wax having a lower PEN value at 43° C. By blending this component with the softer wax a controlled value for the PEN at 43° C. may be obtained.

In order to obtain a wax additive product having the desired PEN and congealing point in combination with a commercial attractive yield of the middle distillate main product it has been found that it is advantageous to start from a relatively heavy Fischer-Tropsch product. The relatively heavy Fischer-Tropsch product has suitably at least 30 wt %, preferably at least 50 wt %, and more preferably at least 55 wt % of compounds having at least 30 carbon atoms. Furthermore the weight ratio of compounds having at least 60 or more carbon atoms and compounds having at least 30 carbon atoms of the Fischer-Tropsch product is suitably at least 0.2, preferably at least 0.4 and more preferably at least 0.55. Preferably the Fischer-Tropsch product comprises a $C_{20}$+ fraction having an ASF-alpha value (Anderson-Schulz-Flory chain growth factor) of at least 0.925, preferably at least 0.935, more preferably at least 0.945, even more preferably at least 0.955.

The initial boiling point of the Fischer-Tropsch product as feed to step (a) may range up to 400° C., but is preferably below 200° C. Preferably any compounds having 4 or less carbon atoms and any compounds having a boiling point in that range are separated from a Fischer-Tropsch synthesis product before the Fischer-Tropsch synthesis product is used in step (a). In addition to the Fischer-Tropsch product also other fractions may be additionally processed in step (a). Possible other fractions may suitably be any excess microcrystalline wax as obtained in step (b).

Such a Fischer-Tropsch product can be obtained by any process, which yields a relatively heavy Fischer-Tropsch product. Not all Fischer-Tropsch processes yield such a heavy product. An example of a suitable Fischer-Tropsch process is described in WO-A-9934917. These processes may yield a Fischer-Tropsch product as described above.

The Fischer-Tropsch product will contain no or very little sulphur and nitrogen containing compounds. This is typical for a product derived from a Fischer-Tropsch reaction, which uses synthesis gas containing almost no impurities. Sulphur and nitrogen levels will generally be below the detection limits, which are currently 5 ppm for sulphur and 1 ppm for nitrogen. The paraffin wax will consequently also have such low sulphur and nitrogen levels. The process conditions and other directions of how to perform the above process have been reported earlier by applicant in WO-A-2004009739.

The present invention further relates to a packaged wax composition, wherein the paraffin wax in the composition is derived from a Fischer-Tropsch process.

Preferably the paraffin wax is obtained by a process comprising the steps of (a) hydrocracking/hydroisomerisating a Fischer-Tropsch product, (b) performing one or more distillate separations on the effluent of step (a) to obtain a middle distillate fuel fraction and a soft paraffin wax additive having an initial boiling point of between 500 and 600° C.

The paraffin wax composition according to the invention comprises a paraffin wax. This a paraffin wax may be a paraffin wax as such (i.e. comprising mainly paraffins, such as n- and iso-paraffins, for instance in an amount of more than 98% by weight, and only a minor proportions of cyclo-paraffins and/or olefins), or a composition of a paraffin wax and one or more additives. The composition of a paraffin wax and one or more additives preferably comprises at least 85% by weight of paraffins, preferably more than 85% by weight, more preferably more than 90% by weight, more preferably more than 95% by weight, more preferably more than 98% by weight, more preferably more than 98.5% by weight, and yet more preferably more than 99% by weight of a paraffin wax. The additives in the composition of a paraffin wax and one or more additives may be such that they improve the handling properties of the wax composition in the application, and/or the properties of the bitumen blend with the wax composition.

The present invention further relates to a process to prepare a packaged wax composition according to any one of the preceding claims, comprising encasing the liquid wax in the thermoplastic polymer packaging material. Any method for packaging wax material which results in paraffin wax packages having a finite size and shape using a film to surround the material is in principle suitable.

Preferably, the process involves packaging the wax product using a coextrusion process, the resulting package formed thereby, and the use of the package in a process to a blend of bitumen and wax.

The wax package may be prepared in analogy to the methods for packaged hot melt adhesives as described in WO-A-02/061009 and WO-A-04/037671, U.S. Pat. No. 6,230,890, U.S. Pat. No. 5,806,285, U.S. Pat. No. 5,401,455, U.S. Pat. No. 5,715,654, U.S. Pat. No. 4,039,485 U.S. Pat. No. 5,373,682, U.S. Pat. No. 5,401,455, U.S. Pat. No. 6,155,029, U.S. Pat. No. 6,138,441, U.S. Pat. No. 5,669,207 and U.S. Pat. No. 5,942,082.

The present invention further relates to a process for blending a liquid bitumen and a paraffin wax by adding to the liquid bitumen the paraffin wax contained in a thermoplastic polymer packaging material as described herein above. This requires the melting point of the thermoplastic polymer material to be at or below the temperature of the liquid bitumen.

The present invention further relates to the use of the packaged paraffin wax in a bitumen composition, and to bitumen compositions prepared by the process.

Bitumen compositions are widely applied as road surfaces for motor vehicles and airplanes. These compositions are also referred to as asphalt and comprise bitumen and aggregates such as sand, gravel, grit or the like. Additives are widely applied to improve certain properties of the bitumen composition for use as road surface.

U.S. Pat. No. 6,588,974, WO-A-0216499 and AU-B-200137219 disclose a bitumen composition containing a Fischer-Tropsch paraffin (FT paraffin) as an additive. According to U.S. Pat. No. 6,588,974 the Fischer-Tropsch paraffin additive is a mixture of more than 90% n-alkanes and the remainder being iso-alkanes. An advantage of adding the FT paraffin additive is that the additive lowers the viscosity of the bitumen composition at elevated, e.g. 135 and 180° C., temperature. This is advantageous because at that temperature the bitumen mixture is used when making road surfaces. In other words the additive improves the workability of the bitumen composition.

According to these publications the FT paraffin has a chain length of between 30 and 100 carbon atoms. AU-B-200137219 exemplifies a commercially available Fischer-Tropsch paraffin additive as SASOBIT (SASOBIT is Registered Trademark). According to the product specifications dated Nov. 11, 2003 for SASOBIT the congealing range according to DIN-ISO 02207 is $\leq 99°$ C. as published by Sasol Wax GmbH, Hamburg.

A problem encountered by the addition of hard, high melting FT paraffin wax additives is that the Fraass point remains the same or even increases when the content of additives increases. The Fraass point (EN12593) is indicative for the brittleness of the bitumen mixture at low temperatures. In this test a sample of bituminous binder is applied on a metal plate. This plate is submitted to a constant cooling rate and flexed repeatedly until the binder layer breaks; the temperature at which the first crack appears is reported as the Fraass breaking point. A low Fraass point is for example desirable when road surfaces are made in areas having a cold climate.

Applicant now found that the Fraass point can be lowered when instead of a highly normal paraffin wax a slightly isomerised paraffin wax is used. Applicant further found that in addition the viscosity at elevated temperatures is lowered comparable to when using the state of the art normal paraffin FT paraffin additive.

Preferably the congealing point and the PEN at 43° C. of such a blended wax has the properties as described above.

Applicants also found that packaging the wax into a thermoplastic polymeric material as set out above permits transport and application at the bitumen application site, without the need for specific heating equipment.

The bitumen composition preferably comprises a bitumen component having a penetration in the range of 1 to 450 mm/10, a softening point from 30 to 130° C., a penetration index between +9 and −3 and a viscosity at 60° C. between 10 to 20,000 Pas.

In the bitumen composition, the content of the paraffin wax is preferably between 0.5 and 10 wt %.

Preferably the wax may be blended with a normal paraffin wax fraction having a congealing point of between 90 and 120° C. as isolated by distillation from the Fischer-Tropsch product. The bitumen composition further preferably comprises a paraffin wax having a congealing point of between 85 and 120° C. and a PEN at 43° C., expressed in 0.1 mm, as determined by IP 376 of more than 5.

A particularly preferred embodiment of the present invention is a paraffin wax having a congealing point of between 85 and 120° C. and a PEN at 43° C., expressed in 0.1 mm, as determined by IP 376 of more than 5 in suitable form for use as a bitumen additive, encased in a thermoplastic polymer material, as set out above. This packaged additive will also be referred in this application as the soft paraffin wax additive.

This packaged soft paraffin wax additive having generally the combination of said congealing point and PEN values is comprised of a major portion of iso-paraffins. The quantity of iso-paraffins is however difficult to quantify in this boiling range. For this reason these more easily quantifiable properties are used. The soft paraffin wax additive has a congealing point of between 85 and 120° C. and a PEN at 43° C., expressed in 0.1 mm, as determined by IP 376 of more than 5. Preferably the congealing point of the above wax is above 90° C.

In order to reduce the Fraass temperature significantly it is preferred to use a soft wax having a PEN at 43° C. expressed in 0.1 mm of greater than 7, more preferably greater than 8 and even more preferably greater than 10. The PEN at 43° C. is preferably below 350. If one desires to achieve both an increase in softening point according to EN1427 and a reduction in Fraass temperature the PEN at 43° C. is preferably between 5 and 70, more preferably between 7 and 70. The TBC-GLC recovery at 450° C. is preferably less than 2 wt %, more preferably less than 1 wt %. The softness of the wax can be influenced by adjusting the process conditions of the manufacturing process and/or by blending soft wax and hard wax, wherein the hard wax can be a more normal paraffinic wax such as for example SASOBIT or the Sarawax SX100 or Sarawax SX105 type wax products as obtainable from Shell MDS Malaysia Sdn Bhd.

The bitumen grades useful for the subject invention include those with penetrations in the range of 1 to 450 mm/10 as determined in accordance with EN 1426. The softening point of suitable bitumens may range from 30 to 130° C., preferably, 40 to 100° C. as determined in accordance with EN 1427. The penetration index of suitable bitumens may range between +9 and −3. The viscosity at 60° C. may be 10 to 20,000 Pas.

The content of soft paraffin wax additive in the bitumen composition according to the invention may be up to 20 wt %, more preferably between 0.1 to 20 wt %, even more preferably between 0.5 to 10 wt %, even more preferably above 3 wt %. Applicant found that when the partly isomerised paraffin wax is used the Fraass temperature decreases, even at higher contents of said partly isomerised paraffin wax. When instead the substantially normal paraffin wax, like for example the commercial SASOBIT product, is used in a high content the Fraass temperature does not improve with respect to the starting bitumen.

The packaged soft paraffin wax additive may be blended with the bitumen using any suitable method. For instance, the additive may be added in a molted state to the bitumen. Preferably though, the bitumen may be in the molten state, which is at a temperature sufficient to dissolve or disperse the additive and the polymeric thermoplastic material. Suitable temperatures range between 120 and 230° C., preferably, 130° C. and 190° C.

It may be possible to add sufficient additive to the bitumen to produce a wax/bitumen blend of the desired final concentration. In certain applications, however, it may be desirable to produce a concentrated blend or "masterbatch" of the additive and bitumen, which may be mixed with additive-free bitumens or bitumen having a low additive concentration to produce blends of the desired final composition. Suitably, the masterbatch may comprise the additive in a concentration of 10 to 30 wt %.

The bitumen composition according to the invention may be employed as a binder for aggregates to form an asphalt composition. The aggregates employed in such compositions include conventional aggregates such as granite. Optionally, fillers of, for example, limestone and cellulose may also be included in the bituminous composition. Sand and dust may also be present.

Next to the paraffin wax additive also other additives may be present. Examples of possible other additives are polymers such as elastomers, for example styrene-butadiene co-polymer, styrene-butadiene-styrene copolymer; plastomers, for example ethylene vinyl acetate co-polymer, poly ethylene and combinations of said polymers, reactive polymers, for example reactive ethylene ter polymer, acrylate copolymers, cross-linking agents, for example sulphur and sulphur containing compounds, adhesion dopes and IP booster, for example polyphosphoric acid.

When the bitumen composition according the invention is employed as a binder with aggregates, the bitumen composition may form 1 to 20 wt %, preferably, 2 to 15 wt %, more preferably, 4 to 10 wt %, and most preferably, 4 to 7 wt % of the overall asphalt composition. The aggregate content of the overall composition maybe more than 50 wt %, preferably, more than 60 wt %, even more preferably, more than 70 wt % for example, 75 to 90 wt %. The remainder of the asphalt composition may comprise sand, cellulose and/or limestone.

When preparing the asphalt composition, the paraffin wax package is preferably added the bitumen in the presence of the aggregates and/or fillers. It may also be possible to mix the additive with the bitumen prior to the addition of aggregate and/or filler.

Asphalt compositions as described above may be used as pavings and coverings for a variety of surfaces, particularly, for example, lorry parks, motorway road surfacing, air fields, residential roads, service station forecourts, car parks, taxiways and driveways.

The bitumen composition may also be beneficially used in so-called top layers and sub layers as accordance with the teaching of U.S. Pat. No. 6,588,974 for normal paraffin wax containing bitumen compositions, which reference is incorporated by reference.

The bitumen composition according to the present invention may also be used as part of a so-called joint sealants, which are for example used to fix concrete elements in airport surfaces, or as part of a roofing felt composition.

What is claimed is:

1. A process to blend a liquid bitumen and a paraffin wax consisting essentially of a paraffin wax derived from a Fischer-Tropsch process by adding to the liquid bitumen the paraffin wax contained in a thermoplastic polymer packaging material, wherein the melting point of the thermoplastic polymer material is at or below the temperature of the liquid bitumen.

2. A bitumen composition obtainable by a process according to claim 1, wherein the bitumen component has a penetration in the range of 1 to 450 mm/10, a softening point from 30 to 130° C., a penetration index between +9 and −3 and a viscosity at 60° C. between 10 to 20,000 Pas.

3. A bitumen composition according to claim 2, wherein the content of the paraffin wax is between 0.5 and 10 wt %.

4. A bitumen composition according to claim 2, wherein the packaged paraffin wax as is blended with a normal paraffin wax fraction having a congealing point of between 90 and 120° C. as isolated by distillation from a Fischer-Tropsch product.

5. An asphalt composition comprising aggregates and between 1 and 20 wt % of the bitumen composition according to claim 2.

* * * * *